United States Patent
Hermey et al.

(10) Patent No.: US 10,294,084 B2
(45) Date of Patent: May 21, 2019

(54) SYSTEM AND COUPLING DEVICE FOR AUTOMATICALLY COUPLING A MOBILE MACHINE, IN PARTICULAR A CONTAINER-STACKING CRANE, TO A MOBILE CONSUMER SUPPLY SYSTEM, AND A COUPLING THEREFOR

(71) Applicant: igus GmbH, Cologne (DE)

(72) Inventors: Andreas Hermey, Hennef (DE); Dominik Barten, Meckenheim (DE); Philip Howold, Frechen (DE)

(73) Assignee: IGUS GMBH, Cologne (DE)

( * ) Notice: Subject to any disclaimer, the term of this patent is extended or adjusted under 35 U.S.C. 154(b) by 301 days.

(21) Appl. No.: 15/116,747

(22) PCT Filed: Feb. 4, 2015

(86) PCT No.: PCT/EP2015/052304
§ 371 (c)(1),
(2) Date: Aug. 4, 2016

(87) PCT Pub. No.: WO2015/118014
PCT Pub. Date: Aug. 13, 2015

(65) Prior Publication Data
US 2016/0347586 A1 Dec. 1, 2016

(30) Foreign Application Priority Data
Feb. 4, 2014 (DE) .................... 20 2014 100 481 U

(51) Int. Cl.
*B60L 11/18* (2006.01)
*B66C 13/12* (2006.01)
*B66C 19/00* (2006.01)

(52) U.S. Cl.
CPC .......... *B66C 13/12* (2013.01); *B60L 11/1801* (2013.01); *B66C 19/00* (2013.01); *B66C 19/007* (2013.01); *B60L 2200/40* (2013.01)

(58) Field of Classification Search
CPC ....... B66C 13/12; B66C 19/00; B66C 19/007; B60L 11/1801
See application file for complete search history.

(56) References Cited

U.S. PATENT DOCUMENTS

| 4,813,224 A | 3/1989 | Blase |
| 5,980,409 A | 11/1999 | Blase |

(Continued)

FOREIGN PATENT DOCUMENTS

| CN | 1207163 | 2/1999 |
| DE | 3531066 | 3/1987 |

(Continued)

OTHER PUBLICATIONS

PCT International Search Report dated Jun. 29, 2015, received in corresponding PCT Application No. PCT/EP2015/052304.

(Continued)

*Primary Examiner* — Jason C Smith
(74) *Attorney, Agent, or Firm* — Grossman, Tucker, Perreault & Pfleger, PLLC

(57) ABSTRACT

A system for automatically docking a container stacker crane, in particular a RTG, to a movable supply, having a docking device with a transverse advancer unit and an extendable extension arm of which an end portion can be advanced transversely to the movable supply and connects thereto. An energy guiding chain with an entrainment member serves as a movable supply. A mechanical coupling is proposed with a coupling piece on the end portion and a coupling counterpart on the entrainment member. The entrainment member floatingly supports the coupling coun- (Continued)

terpart with transverse play. A plug connector on said end portion cooperates with a socket on the entrainment member. The mechanical coupling has a coupling piece configured as a funnel and a cooperating coupling counterpart configured as coupling head. The coupling head includes at least one extension, which cooperates with the funnel and/or a locking bolt for securing perpendicular to the longitudinal direction. The locking bolt cooperates with the extension for securing in the longitudinal direction, and for securing the coupling head in a fixed position.

18 Claims, 6 Drawing Sheets

(56) References Cited

U.S. PATENT DOCUMENTS

| | | | |
|---|---|---|---|
| 8,499,911 | B2 | 8/2013 | Ichimura |
| 2011/0220447 | A1* | 9/2011 | Schroder ............... B60L 5/38 191/50 |
| 2012/0043291 | A1* | 2/2012 | Ichimura ............... B66C 13/12 212/312 |
| 2014/0305760 | A1* | 10/2014 | Maier ................... B60L 5/08 191/59.1 |
| 2016/0347586 | A1* | 12/2016 | Hermey ................ B66C 13/12 |

FOREIGN PATENT DOCUMENTS

| | | |
|---|---|---|
| DE | 3930291 | 4/1991 |
| DE | 102008024572 | 11/2009 |
| EP | 1359343 | 11/2003 |
| JP | 2009-242101 | 10/2009 |
| WO | 2010/054852 | 5/2010 |
| WO | 2010/101244 | 9/2010 |
| WO | 2012/130630 | 10/2012 |

OTHER PUBLICATIONS

PCT English language International Preliminary Report on Patentability and Written Opinion dated Aug. 9, 2016, received in corresponding PCT Application No. PCT/EP2015/052304.
English translation of Office Action from related Chinese Appln. No. 201580018189.X, dated Jul. 2017.

* cited by examiner

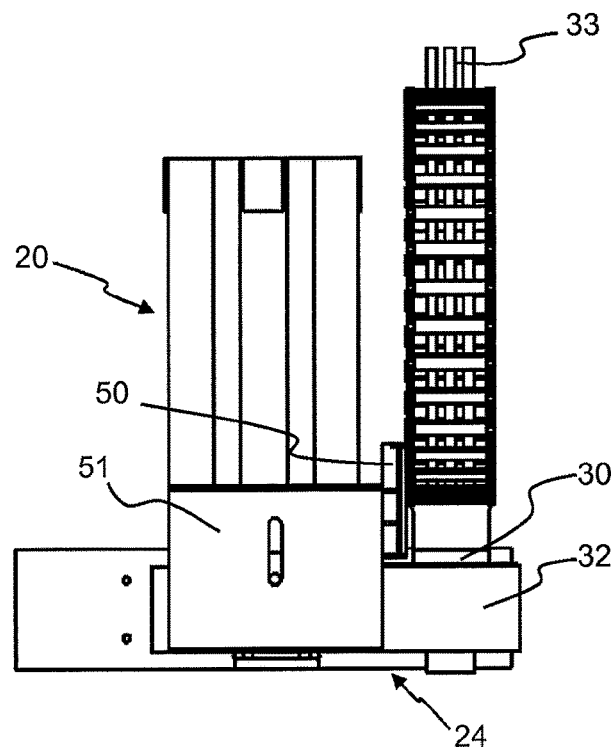
FIG.5A
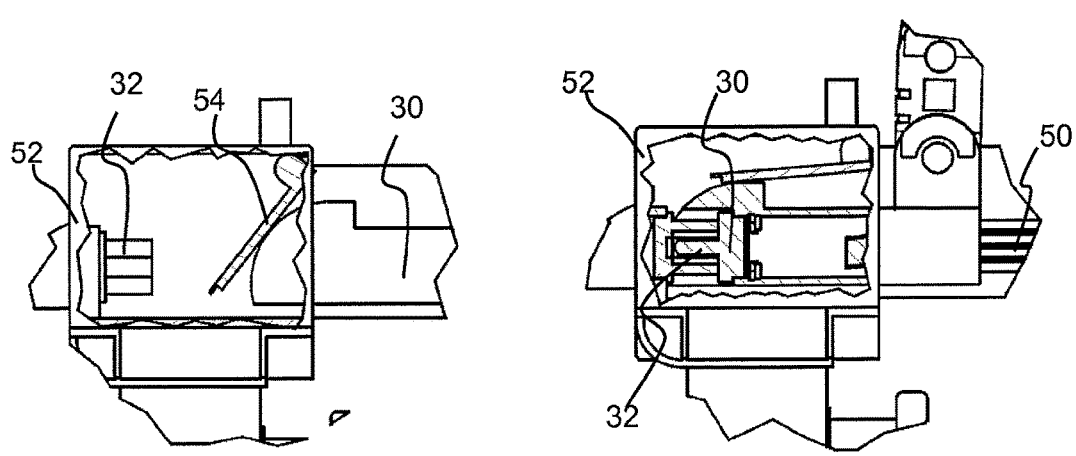
FIG.5B
FIG.5C

SYSTEM AND COUPLING DEVICE FOR AUTOMATICALLY COUPLING A MOBILE MACHINE, IN PARTICULAR A CONTAINER-STACKING CRANE, TO A MOBILE CONSUMER SUPPLY SYSTEM, AND A COUPLING THEREFOR

FIELD

The invention relates generally to a movable supply, i.e. a device for supplying a mobile or movable consumer, e.g. for supplying energy to a non-rail-bound vehicle.

The invention particularly relates to a partly or fully automatic system for docking a mobile machine to said movable supply. The invention further relates to a docking device therefor and to a mechanical coupling, particularly for use in a system of the kind as described. The invention also relates to the use of a system for electrifying or supplying electrical power to a mobile machine such as rubber-tire gantry crane (RTG).

BACKGROUND

International patent application WO 2010/054852 A2 discloses a system for automatically docking a mobile machine to a movable supply. It is particularly suitable for automatically docking an RTG to a conductor rail serving as a movable supply. This system comprises a docking device having an advancer unit for advancing in a direction transversely to said conductor rail, by means of an extension arm. On the end portion with which the extension arm can be advanced to said conductor rail, a special carriage for connection to the conductor rail is provided. Said carriage holds the sliding contacts to be coupled in said conductor rail in the horizontal and vertical directions. Said carriage is guided and supported against supporting rails, which are additionally provided.

Patent application DE 10 2008 024 572 A1 describes a similar system, especially for docking an RTG to a conductor rail. A telescopic extension arm is suggested with this system, the arm being docked to the conductor rail using a special collector trolley. This collector trolley allows for play in the vertical direction as well as transversely to the mobile direction. This allows use of a trail with conductor rail, which is known as such, also in combination with a vehicle mobile on tires, in particular with an RTG.

A further system which similarly serves especially the power supply of an RTG by a conductor rail, is known from international patent application WO 2012/130630 A1. Compared to the system described in WO 2010/054852, this system is intended to remove the drawback of a complicated advancer device for advancing the current collector to said conductor rail. In addition to a transverse advancer unit comprising an extension arm extendable in the horizontal direction, that docking device includes a vertical advancer unit allowing the end portion of said extension arm to be advanced also in the vertical direction.

Automatic docking of a mobile machine to a moving supply for supplying electric current is desirable in many applications. The electrification of vehicles including a dedicated Diesel generator for supplying electric driving motors is particularly efficient and not harmful to the environment. This is mostly the case with stacker cranes of the RTG type for example. To reduce the consumption of Diesel fuel, electrification is also desirable for so-called pneumatic-tire van entrainment members, which in most cases can stack containers only in a row. RTGs and van entrainment members are employed in docks or other container handling sites. But electric current supply is also desirable in other fields, for example for a stacker/reclaimer in surface mining or underground mining.

Known solutions are mainly based on the principle of a conductor rail having a current collector as a movable supply. The sliding contacts on the conductor rail are inherently subject to considerable wear. Conductor rails are robust, but require frequent and elaborate maintenance. In addition, they are suitable for data signal transmission only to a limited extent, and they are not suitable for supplying different media such as gaseous or liquid operating media. For example, a solution that is based on a conductor rail cannot provide for a water supply of a sprinkling system of a stacker/reclaimer. Neither can vehicles equipped with pneumatic tires like RTGs be supplied by using a movable supply that is based on the principle of a conductor rail. Finally, conductor rails cannot be extended without considerable efforts and they are not suitable for modular use.

Another solution is known from patent application US 2012/043291 A1. The latter suggests, as an alternative to conductor rails, supplying an RTG with a cable reel or with an energy guiding chain. To respect a given travel direction a power supply truck that runs on rails (rail-bound) is provided in addition to the RTG, the truck including the cable reel or being connected to the energy guiding chain. In order not to impair the freedom of movement of the RTG, the power supply truck is connected to the RTG by way of a special mechanical docking device, that allows for significant play both vertical and in transverse direction. The connection of power supply between the power supply truck and the RTG is to be made manually.

SUMMARY

In view of the above-described drawbacks, it is a first object of the present invention to offer an alternative, in particular an alternative that does without a conductor rail, an additional collector trolley or the like. At the same time, there shall be proposed a system and a docking device for automatically docking a mobile machine to an alternative movable supply. Depending on the tracking accuracy of the mobile machine and/or the magnitude of possible lateral forces, these objects are achieved by a partly or fully automatic system. In addition, the docking device independently contributes to the solution of the problem. Further, a mechanical coupling shall be proposed which is particularly suitable for said docking device or system.

According to the present invention, a system of this general kind, particularly for use with machines with high tracking accuracy and/or involving small lateral forces, in its most simple implementation is characterized in that an energy guiding chain including an entrainment member is provided as a movable supply and that the system includes on the one side a mechanical coupling for connecting the extension arm to the entrainment member and on the other side a cable-coupling by means of a plug connector on the extension arm and a corresponding socket on said entrainment member. Said mechanical coupling mainly consists of a coupling piece on the end portion of the extension arm and a coupling counterpart on the entrainment member, said coupling pieces cooperating for fixing a position. The cables at the interface between the energy guiding chain and the docking device are coupled by the plug connection, which consists of said plug connector and the corresponding socket.

The proposed structure particularly allows the use of energy guiding chains designed in the proven manner, even though the machine to be supplied not necessarily travels exactly parallel to the longitudinal direction of the energy guiding chain. Here the mechanical coupling rigidly connects the extension arm to the entrainment member of the energy guiding chain, and after that or at the same time said plug connection makes the connection of necessary supply lines, for example power supply lines and data transmission lines.

For mobile machines involving larger deviations between the track and the longitudinal course of the energy guiding chain and/or involving higher lateral forces, a further, independent solution also provides for an energy guiding chain including an entrainment member that is provided as a movable supply, wherein a coupling piece on the end portion of the extension arm and a cooperating coupling counterpart on the entrainment member of the energy guiding chain form a mechanical coupling. For compensating deviations and/or for receiving undesired lateral forces, this further solution according to the invention is characterized in that the entrainment member forms a floating mounting for the coupling counterpart, i.e. the latter is mounted transversely to the energy guiding chain with horizontal play and in a floating manner.

Depending on the respective application, this already allows to avoid any undesired lateral force at the chain or to compensate for a deviation from the track such as in an RTG for example.

Both of the proposed systems allow the use of an energy guiding chain as an alternative to a conductor rail or a contact line for the supply of a mobile consumer.

An expensive line with conductor rails, as in WO 2010/054852 A2, DE 10 2008 024 572 A1 or in WO 2012/130630 A1 is not necessary. Also, a special collector trolley is not required. The presently suggested systems, contrary to e.g. the system of US 2012/043291 A1, do without an additional truck with directional stability.

In both systems it may be advantageous, particularly in the case of major deviations from the track, to provide an advancing control cooperating with a detector arrangement as an error sensing device on the entrainment member on the one side and with the transverse advancer unit of the docking device as an actuator on the other side. The advancing control is configured in a manner such as to newly adjust or re-adjust if necessary the horizontal position of the extension arm during mobile corresponding to the course of the energy guiding chain, so as not to exceed for instance the available horizontal play at the entrainment member. Small deviations between the running directions of the energy guiding chain and the track are able to be compensated already by a floating mounting. The horizontal advancer device that is provided anyway, is additionally utilized for compensating larger deviations unable to be compensated by said floating mounting or for enabling a smaller dimensioning thereof.

All in all, said advancing control allows the use of a robust and proven energy guiding chain, particularly an energy guiding chain, which per se not offers said entrainment member any degree of freedom in the horizontal direction.

Particularly in a system without an advancer device, it is advantageous for the system to include a guide channel in which the energy guiding chain can be deposited and which presets or defines a route for said energy guiding chain. Particularly, said route can be almost rectilinear or linear. The configuration of suitable guide channels is known per se. The same especially protect said energy guiding chain itself against undesired external influences.

Particularly in open-air applications, it is advantageous for the guide channel being configured in manner such as to include a weather protection such as a roof for example. In this case, it is required to provide a lateral longitudinal gap through which the docking device can access the entrainment member of the energy guiding chain.

For avoiding or reducing wear, it is further advantageous for the guide channel having on both sides thereof lateral sliding strips, by which the entrainment member is preferably guided approximately centrally within said guide channel. For presetting a defined stop position for said automatic docking, corresponding sliding strips should be provided at least at a stop position or parking position in which the entrainment member is deposited for docking or undocking. The protection of the lines which are guided can be increased by using an energy guiding chain that is closed with lids on the upper and lower sides thereof, e.g. according to German utility model DE 20 2013 101 457 U1 or patent DE 39 30 291 C1.

Particularly in a system without a floating mounting to the entrainment member and/or without an advancer device, it is useful if the guide channel of the energy guiding chain forms a mechanical longitudinal guide for the entrainment member, i.e. a guide in the longitudinal direction of the energy guiding chain and receives lateral forces which are due to track changes of the mobile machine for example. This solution is particularly suited in the case of smaller lateral forces, with the extension arm being capable to extend or retract for compensation, if necessary through the mere reaction force of the longitudinal guide.

In a system comprising an advancer device, a simple embodiment of the detector arrangement provides that the latter includes two proximity switches, which are each provided laterally on the entrainment member, particularly on the floating mounting of the entrainment member, for detecting whether the entrainment member or the floatingly mounted part of the entrainment member excessively approaches lateral stoppers. The detector arrangement can preferably be connected to the advancer device via a plug connector of the docking device. For this purpose, either the existing plug connector may be used or an additional plug connector may be provided.

For providing a sufficient range for the mobile machine, for example the RTG, in the transverse direction, it is expedient for the range of the extendable extension arm being at least three times and preferably ten times the horizontal play at the entrainment member, particularly the horizontal play of the floating mounting. This horizontal play itself preferably is within a range of 25% to 200% of the width of the energy guiding chain.

In addition to the use of proven energy guiding chains, the proposed system enables automatic coupling of data transmission lines, particularly optical data transmission lines, and/or hose pipes for supplying the machine with liquid or gaseous operating media. These lines can also be easily guided using an energy guiding chain according to the invention.

In a preferable embodiment, in addition to the functionality required for the actual advancing process, the advancing control is adapted for maintaining the horizontal play at the entrainment member in order to implement the above-mentioned compensation function, i.e. to make a re-adjustment when the admissible distance in the transverse direction is exceeded and/or to trigger an emergency stop of the machine when the extension arm is extended or retracted to the limit. In terms of control, the advancing control can be designed as a true open-loop control, i.e. without feedback of the quantity to be measured, or as a true closed-loop control with feedback of the quantity to be measured.

The proposed systems are particularly suitable for electrifying or for the power supply of a mobile machine, either without track-keeping of a container stacker crane provided with pneumatic tires (RTG) for example or with a certain degree of track-keeping or with full track-keeping of a rail-born container stacker crane for example.

The invention further relates to a docking device especially for the automatic docking of a mobile machine, e.g. a container stacker crane, to a movable supply. The docking device is separate from the energy guiding chain and constitutes an independent aspect that is deemed protectable on its own merits. Said docking device is claimed independently of the movable supply and of the system including a movable supply.

The docking device of this generic kind is suitable for both systems. According to the invention, the docking device is characterized in that on the end portion of the extendable extension arm a coupling piece is provided that can be connected to the cooperating coupling counterpart on the entrainment member and cooperates with said coupling counterpart for fixing a position. The docking device is further characterized in that a plug connector for supplying the mobile machine, particularly with energy, is provided on said end portion. The plug connector meshes with a cooperating socket on the entrainment member of the energy guiding chain so that the same can be docked to the mobile machine for a connection of the supply lines. Particularly, the plug connector can electrically dock the mobile machine to the movable supply, but also for transmitting information or for supplying operating media.

Accordingly, the relative position is fixed by said coupling pieces, which in turn allows the use of plug connectors for the energy supply of the mobile machine and if necessary for supplying data or operating media.

In addition to the horizontal and vertical advancer units, said docking device preferably includes a longitudinal advancer unit with which the end portion of the extension arm, if necessary together with the horizontal and/or vertical advancer unit, can be advanced in the longitudinal direction relative to the movable supply, e.g. the energy guiding chain. This avoids the necessity of moving the mobile machine for docking. The additional longitudinal advancer unit can produce a corresponding movement of the end portion of the extension arm in the mobile direction or in the length direction of the movable supply, for connecting the coupling piece to the coupling counterpart. The horizontal and vertical advancer units can be used first in order to bring the end portion of the extension arm to the initial position for docking.

Full automation is facilitated if position transmitters are provided on the end portion of the extension arm, which serve the determination of the horizontal and vertical positions of the end portion and if necessary of the longitudinal position when an additional longitudinal advancer unit is provided, relative to the energy guiding chain to be docked. Corresponding position transmitters cooperate if necessary with an advancing control or with the advancing control. In this manner, a drive of the transverse advancer unit and a drive of the vertical advancer unit can be controlled for automatic docking in order to precisely approach the docking position.

Preferably, and particularly in the fully automated embodiment, the plug connector is operatively connected to an independent drive, especially to a drive for advancing the plug connector in a direction parallel to the horizontal feeding direction. The plug connection can thus be produced independently, for example during the final phase of the connection of the mechanical coupling pieces or also after the connection of the coupling pieces.

The socket for the plug connector provided on the entrainment member preferably includes a weather protection with a protective lid for the protection of the plug connection against weather influences. The protective lid can be easily opened and closed by moving the plug connector.

The proposed docking device is particularly suitable for docking to an energy guiding chain.

In addition to the proposed system and the docking device therefor, the invention relates a mechanical coupling comprising a coupling piece constructed as a funnel and a cooperating coupling counterpart constructed as a coupling head. The proposed mechanical coupling is suitable, although not exclusively, for a docking device or system such as described above. It represents an additional, independent aspect, which is deemed protectable on its own merits.

According to the invention, the proposed mechanical coupling is characterized in that the coupling head comprises at least one extension which for securing in a direction perpendicular to the longitudinal direction along which the coupling head is introduced into the funnel, cooperates with the funnel and/or a locking bolt of the coupling in a form-locking manner. The securing in a direction perpendicular to the longitudinal direction can be effected particularly with respect to the two main directions or axes of an axes system, which are perpendicular to the longitudinal direction. Further, the proposed mechanical coupling is characterized in that the locking bolt cooperates with said at least one extension, for securing in the longitudinal direction. Further, according to the invention, the coupling is designed in a manner such that after the locking said coupling head is fixed in a predetermined fixed position on the funnel.

By presetting a fixed relative position between the coupling piece and the coupling counterpart, it is achieved among others that subsequently an electrical coupling by means of a separate plug connection, for example between the entrainment member of an energy guiding chain and the end portion of the extension arm, can be produced. It is further achieved by the proposed construction that a rigid connection between the coupling pieces is produced and forces are thus transmitted in all direction. This too is desirable, particularly when used together with a plug connection for supply lines.

In an alternative or additional embodiment, the electrical coupling can also be implemented using the components of the mechanical coupling, e.g. by contacts on the locking bolt and on the extension or extensions.

Preferably, the mechanical coupling is configured in a manner such that the funnel comprises a seat area securing the at least one extension against twisting, particularly with respect to all axes of the axes system. With a funnel constructed in a corresponding manner, for example the entrainment member of an energy guiding chain can be completely fixed against rotation on the machine part to be docked.

In a preferable form of construction, two bollard-like extensions are provided, each presenting a bulge on the upper end. Said bulge can be knob-, crown- or crest-shaped or spherical or similarly shaped. Both extensions are adapted for a form-locking engagement with the seat. This construction affords a stable, tolerance-free and rotationally fixed connection between the funnel and the coupling head. If necessary, it also facilitates incorporating electrical contacts for an electric current supply.

Also different designs of the extensions such as T-shaped flange having a through hole for the engagement of the locking bolt are conceivable and are within the scope of the invention.

Preferably, the mechanical coupling is constructed in a manner such that the at least one extension can be inserted in the funnel partly or fully along a longitudinal direction. Here centering slopes for inserting the extensions are preferably provided on the funnel.

The features mentioned above with regard to the coupling or the docking device can be applied to the system and vice versa, as far as these features are concerned with associated components. Accordingly, the above described preferred embodiments are claimed as relevant for the system, the docking device and if applicable for the mechanical coupling.

BRIEF DESCRIPTION OF THE DRAWINGS

Further details, advantages and features of the invention will become apparent from the following description of a preferred exemplary and non-limiting embodiment of the invention with reference to the attached drawings wherein it is shown by:

FIGS. 5A-5C are partial views of a plug connection for the electrical coupling between the docking device and the energy guiding chain;

DETAILED DESCRIPTION

Figure 1A:
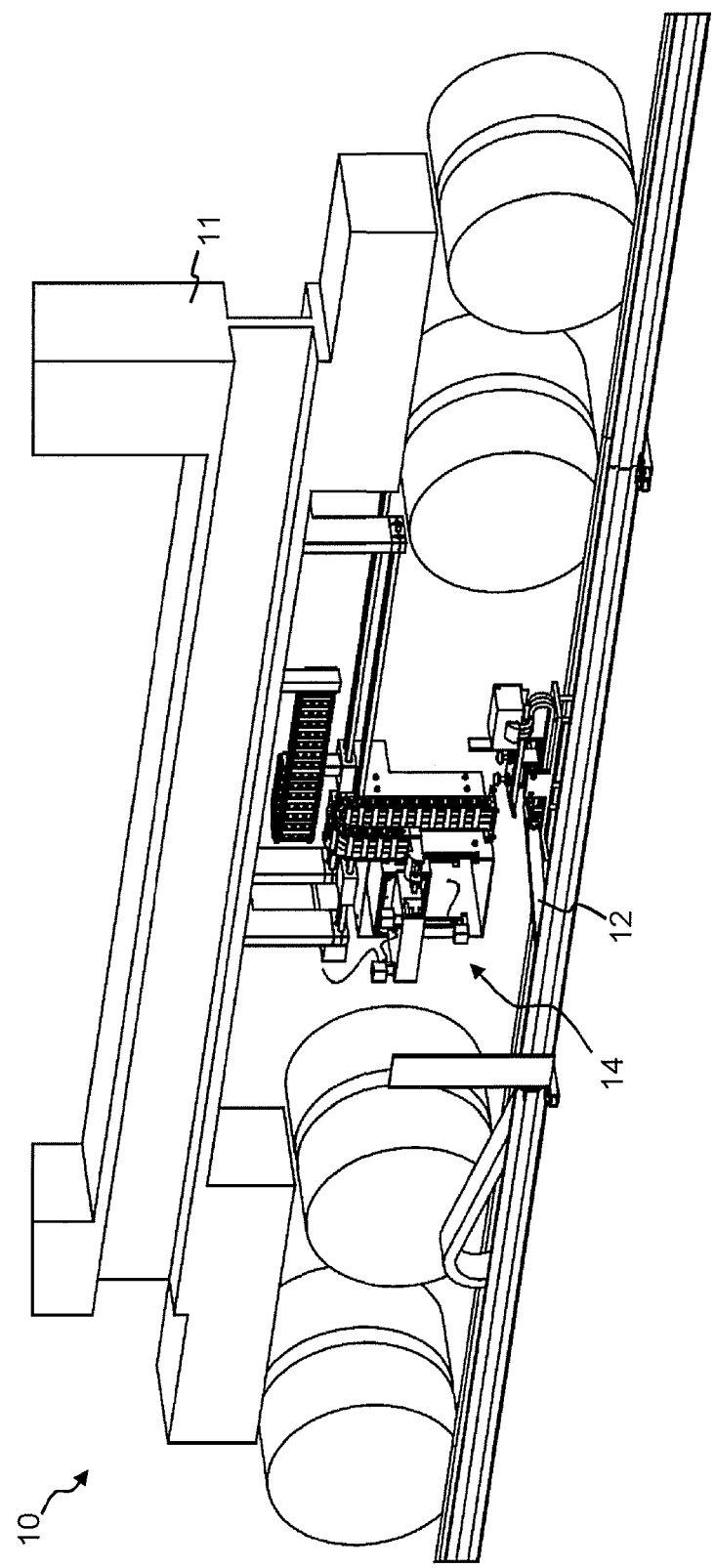
FIGS. 1A-1B are schematic perspective views of a system for fully automatically docking a vehicle, here an RTG, to an energy guiding chain (FIG. 1A) as well as an enlarged view of a docking device therefor (FIG. 1B)

FIG. 1A shows in a schematic diagram a system 10 for automatically docking an RTG 11 to a movable supply which according to the invention is constructed as an energy guiding chain 12. This Figure only shows one base with rubber tires of said RTG 11. The structure of energy guiding chain 12 is known per se, e.g. a structure consisting of interlinked and mutually pivotable chain links, which in turn are mostly composed of two or four single pieces. A suitable energy guiding chain is for example an energy guiding chain 12 according to patents DE3531066C2 or EP0803032B1 or according to EP1359343B1, the teaching thereof concerning the chain links and linkage being incorporated herein by reference.

Figure 1B:
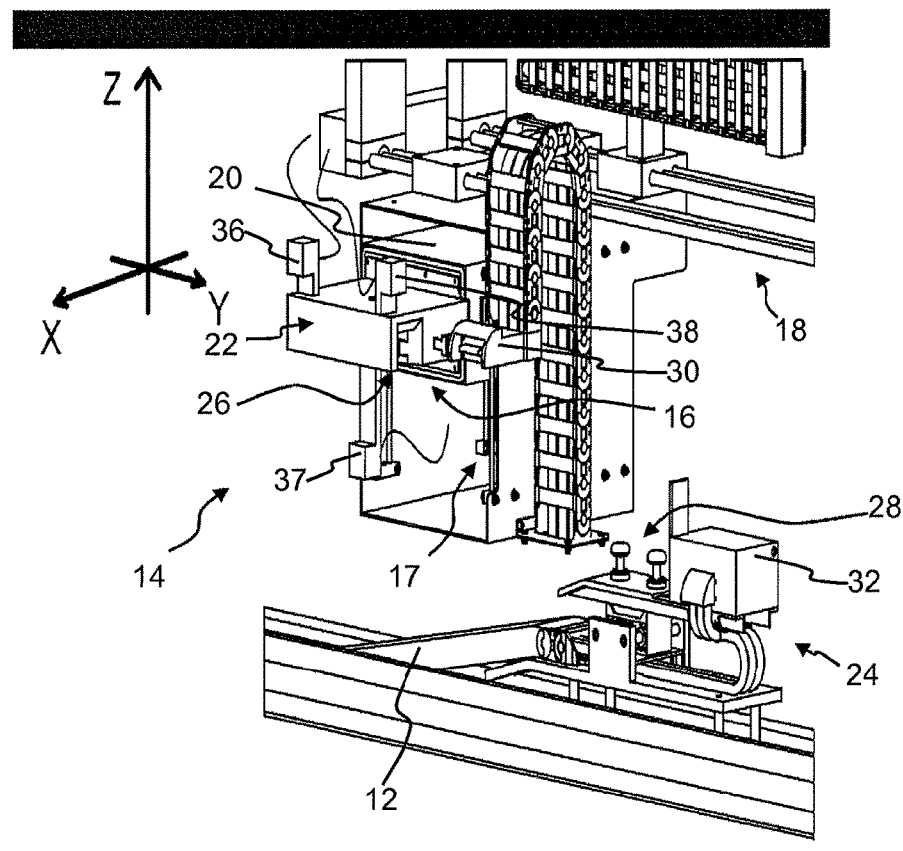

The system 10 comprises a docking device 14 shown in more detail in FIG. 1B. The docking device 14 comprises a transverse advancer unit 16 for advancing in a direction transversely to the longitudinal run of energy guiding chain 12 (X-axis in the axis system of FIG. 1B), i.e. approximately horizontally, a vertical advancer unit 17 for advancing in an approximately vertical direction (Z-axis in FIG. 1B) as well as an additional longitudinal advancer unit 18 with which said transverse advancer unit 16 and said vertical advancer unit 17 can be advanced in a longitudinally displaceable manner (Y-axis in FIG. 1B) substantially in the mobile direction of the RTG 11. All said advancer units 16, 17, 18 are automatically adjustable and are equipped with corresponding drive mechanisms such as electromotive linear axes (only partly shown).

Figure 2A:
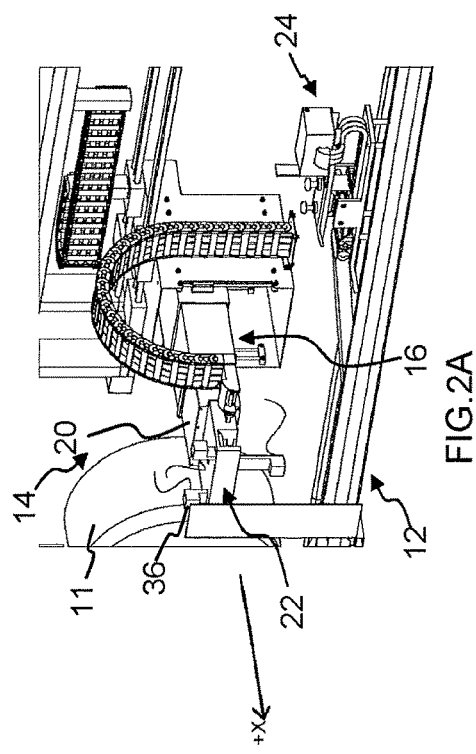
FIGS. 2A-2D are schematic perspective illustrations of steps of a process of docking to an energy guiding chain using a docking device according to FIG. 1B.

As shown by a comparison of FIG. 1B and FIG. 2A, said transverse advancer unit 16 comprises an extendable and retractable extension arm 20 whose end portion 22 can be advanced transversely to the longitudinal direction of the energy guiding chain 12.

Figure 3:
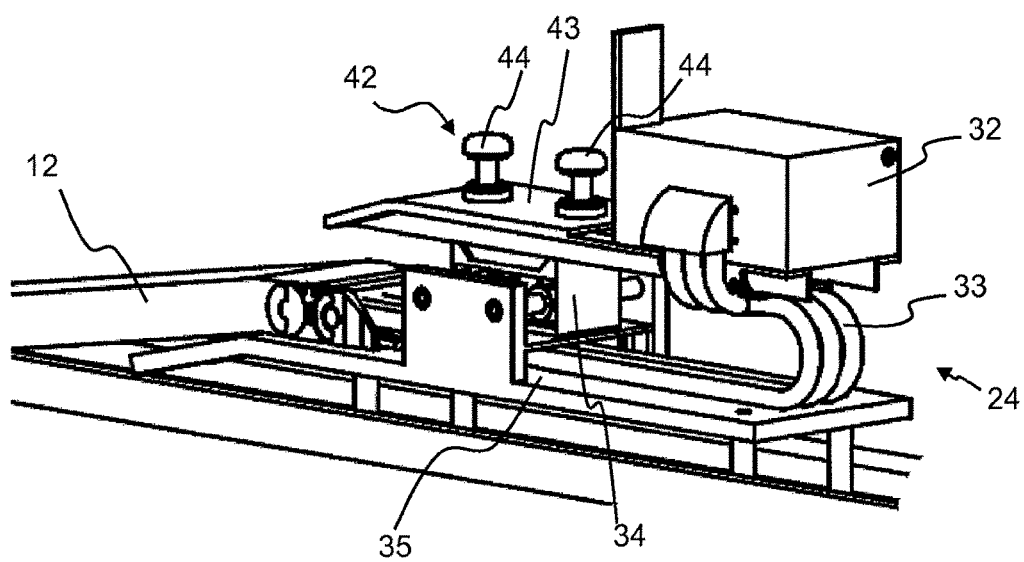
FIG. 3 is an enlarged perspective view of a coupling head on the entrainment member of the energy guiding chain which cooperates with the docking device according to FIG. 1B.
Figure 2B:
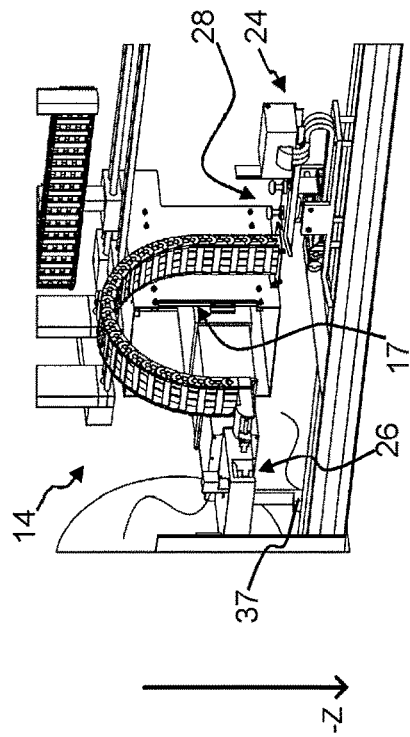
Figure 2C:
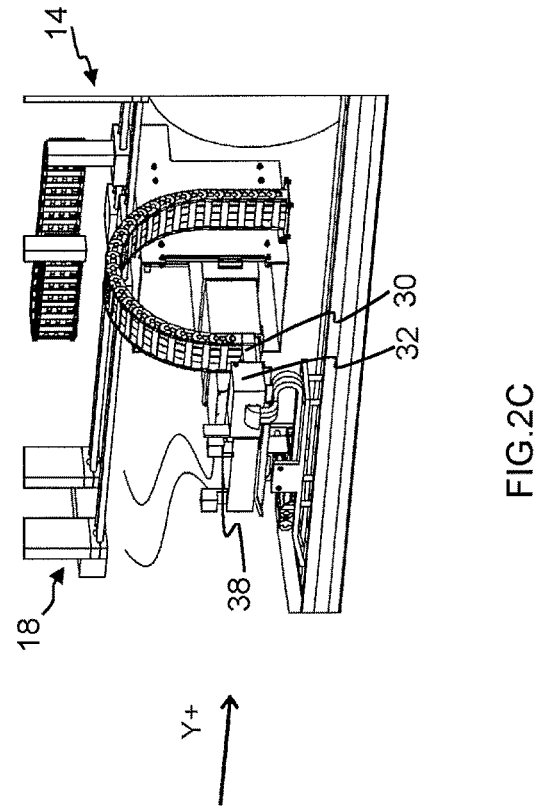
Figure 2D:
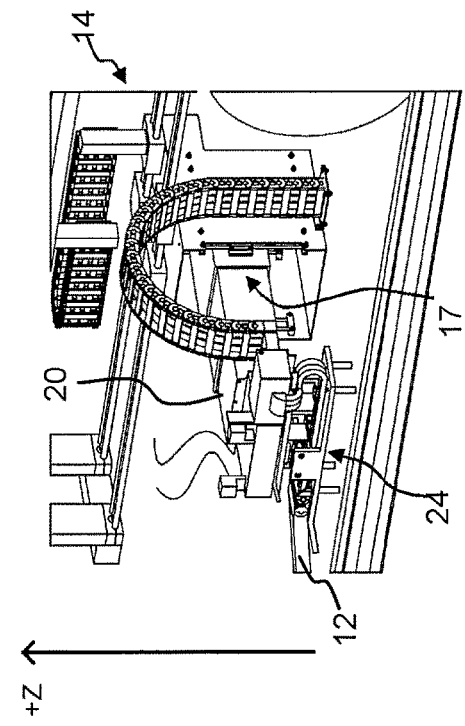
Figure 6:
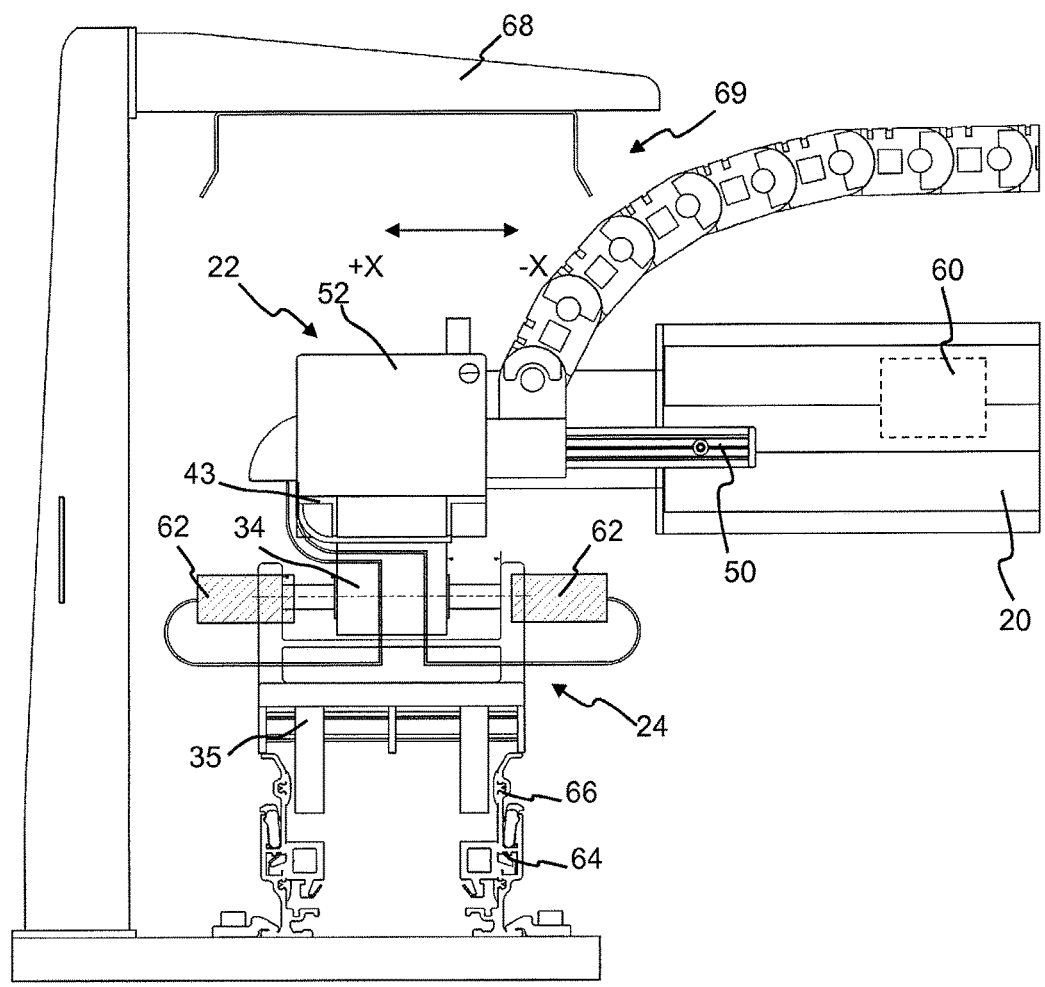
FIG. 6 is a schematic cross-sectional view of the energy guiding chain with an entrainment member and a coupling counterpart floatingly supported with play, wherein only a part of said docking device is shown.

The energy guiding chain 12 comprises an entrainment member 24 shown more detailed in FIG. 3 and FIG. 6, to/from which entrainment member said end portion 22 is docked/undocked fully automatically by means of said docking device 14 (see FIG. 2D). For this purpose, said end portion 22 of the extension arm 20 comprises a first coupling piece 26 designed in such a manner as to mesh with a cooperating coupling counterpart 28 on the entrainment member 24. Said coupling piece 26 and coupling counterpart 28 form a mechanical coupling which in the connected state fixes the position of the coupling counterpart 28 on the entrainment member 24 relative to said coupling piece 26. A suitable example of such a coupling will be described in the following with reference to FIG. 4A-4D.

As shown in FIG. 1B, a plug connector 30 is provided on the end portion 22 of the extension arm 20, for automatically coupling and decoupling the lines required for said RTG 11. Said plug connector 30 is connected to a corresponding socket 32 on the entrainment member 24. By means of said plug connection the RTG 11 can be supplied, particularly with electric current.

First of all, the sequence of an automatic docking process starting from FIG. 1A will be explained in more detail by means of a sequence of snapshots in FIG. 2A-2D:

i) In a start position as shown in FIG. 1A, RTG 11 with its base is driven up laterally and parallel to the energy guiding chain 12 with a suitable distance. Because of the docking device 14, the exact position of RTG 11 is not decisive here. However, the docking device 14 should be located in the region of the parking position or stop position of the entrainment member 24 shown in FIG. 1A.

ii) According to FIG. 2A-2B, the transverse advancer unit 16 first advances the end portion 22 to a desired position in a direction transversely to the energy guiding chain 12 (X-axis). On said end portion 22, position transmitters 36, 37, 38 are each provided for the desired positions in the horizontal, vertical and longitudinal directions (X-, Z-, Y-axes in FIG. 1B). The position transmitter 36 signalizes the desired position in the horizontal direction (X-axis) by means of a reference sign provided on the energy guiding chain 12.

iii) FIG. 2B illustrates the vertical advancing of the end portion 22 of the extension arm 20 by means of the vertical advancer unit 17. The arrival at the desired position in the vertical direction (Z-axis) is detected by the position transmitter 37 and by a corresponding reference sign provided on energy guiding chain 12.

iv) FIG. 2C shows the end position for coupling the supply lines. After reaching the desired nominal height according to FIG. 2B, the longitudinal advancer unit 18 advances the end portion 22 together with the entire extension arm 20 of the transverse advancer unit 16 and the vertical advancer unit 17 in the mobile direction (Y-axis) of the RTG 11. The mobile direction not necessarily corresponds exactly to the longitudinal direction of the energy guiding chain 12, but substantially. The longitudinal advancer unit 18 moves the end portion 22 to the end position according to FIG. 2C where it engages with the entrainment member 24. The position transmitter 38 signalizes the desired position in the longitudinal direction (Y-axis) by means of a corresponding reference sign provided on the entrainment member 24.

v) After reaching the end position according to FIG. 2C, the mechanical locking or position fixing of the entrainment member 24 on the end portion 22 of the extension arm 20 takes place by means of the coupling piece 26 and the coupling counterpart 28. Immediately thereafter, the supply lines to be connected are coupled by means of the plug connector 30 and the socket 32. As apparent from FIG. 2A-2D, the transverse advancer unit 16 and the longitudinal advancer unit 18 comprise additional energy guiding chains for movably guiding the supply lines from the RTG 11 to the plug connector 30.

vi) In a final step according to FIG. 2D, the entrainment member 24 is slightly lifted in the vertical direction (Z-axis) by the vertical advancer unit 17 in order to provide sufficient play in the vertical, e.g. for receiving a heavy load at the RTG 11.

Undocking the entrainment member 24 from the end portion 22 proceeds in the reverse order (FIG. 2D->FIG. 2A), and the entrainment member 24 is deposited at a predetermined parking position in the longitudinal direction of the energy guiding chain 12 (see FIG. 1B).

FIG. 3 shows in an enlarged perspective view the structure of the entrainment member 24. The entrainment member 24 has on its upper end portion said coupling counterpart 28 (in the following briefly referred to as counterpart 28) that is arranged in such a manner as to be accessible to the coupling piece 26 on the extension arm 20 laterally and from the top. The counterpart 28 is arranged laterally of the final chain link of the energy guiding chain 12 (schematically illustrated). On the far side of the entrainment member 24 in the longitudinal direction (Y-axis), the socket 32 for the plug connector 30 is provided, via which supply lines 33 for energy, data and/or media are coupled. The counterpart 28 and the socket 32 are movably or floatingly supported in the horizontal direction (X-axis) relative to a guide block 35 of the entrainment member 24, by means of a float 34. The guide block 35 forms the movable connection point for a final chain link of the energy guiding chain 12.

FIG. 4A-4D show an exemplary structure of a mechanical coupling which is particularly suitable for the implementation of the coupling piece 26 and the coupling counterpart 28 (counterpart 28). The coupling piece 26 in FIG. 4A-4D comprises a funnel 40 (also referred to as coupling funnel). The counterpart 28 in FIG. 4A-4D is correspondingly formed as a coupling head 42 meshing with the funnel 40. The coupling head 42 substantially consists of two extensions 44 and a base plate 43 (see FIG. 3) from which the extensions 44 protrude vertically upwardly. The funnel 40 forms a seat extending in the longitudinal direction (Y-axis), which cooperates in a form-locking manner with the approximately I-shaped or T-shaped profile (in the X-Z plane) of the extensions 44 so that in the caught state the coupling head 42 and hence also the counterpart 28 are secured vertically to the longitudinal directions (Y-axis), here along both axes (X-axis, Z-axis) of the axes system.

Further, the coupling piece 26 comprises a locking bolt 46 supported in such manner as to be adjustable in the horizontal direction (X-axis). Said locking bolt 46 cooperates with said two extensions 44 in a form-locking manner for additionally securing the coupling head 42 at least in the longitudinal direction (Y-axis), preferably additionally in the vertical direction (Z-axis) within said funnel 40, i.e. on the coupling piece 26. By this form-locking connection, see FIG. 4B-4D, it is achieved that the coupling head 42 after being interlocked with said locking bolt 46 is maintained in a fixed preset position within said funnel 40. Said counterpart 28 is thus fixed in a defined position on the coupling piece 26.

Figure 4A:
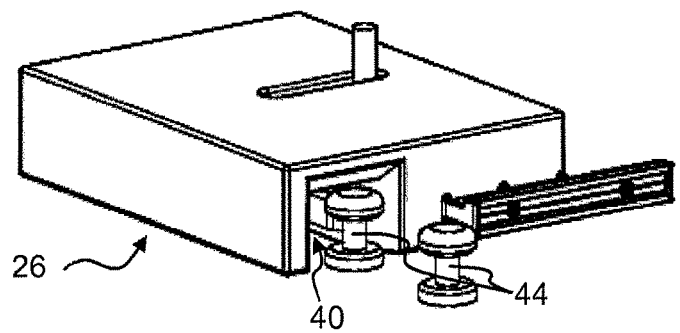
FIGS. 4A-4D are partial views of a mechanical coupling, particularly for a system according to FIG. 1A-1B.

FIG. 4A shows centering slopes 48 that are provided for compensating minor tolerances or the horizontal play of the float 34. Said centering slopes 48 at the mouth of the funnel 40 respectively serve as upwardly opening inclined surfaces for centering the extensions 44 during the positioning of the end portion 22. In this manner, said coupling head 42 is pre-positioned for introducing the counterpart 28 into the funnel 40 along the longitudinal direction (Y-axis) for locking.

Figure 4B:
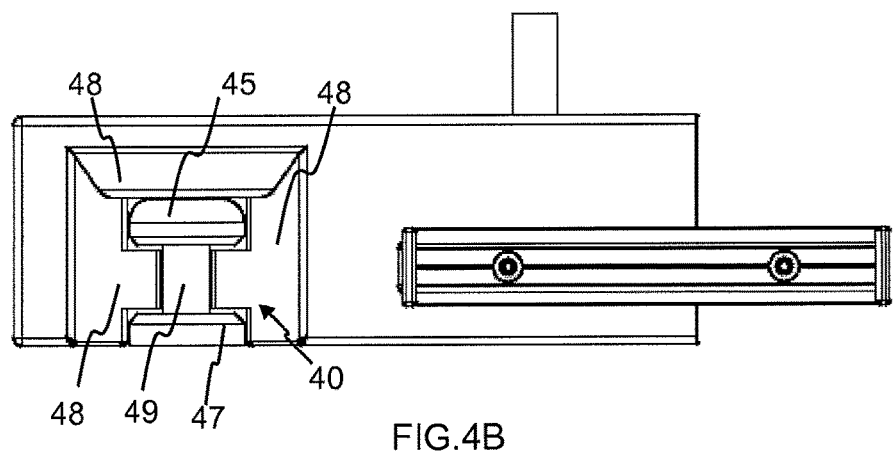
Figures 4C, 4D:
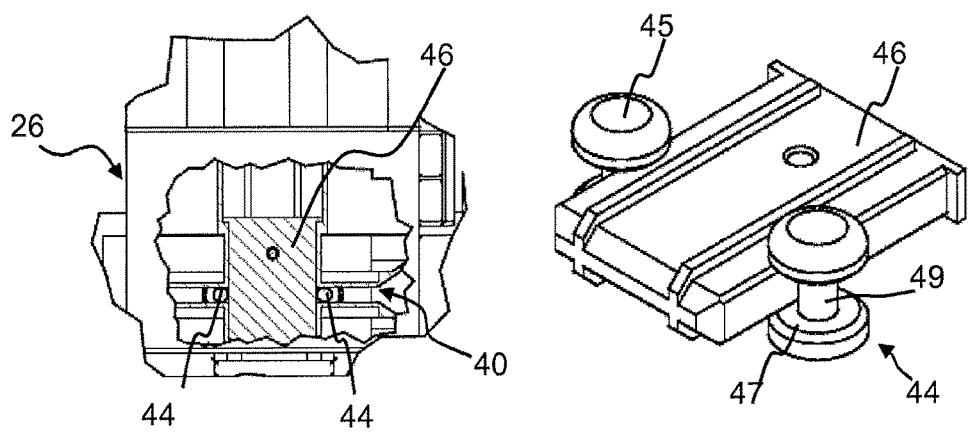

As best seen in FIG. 4B and FIG. 4D, the extensions 44 are bollard-like with a bulge 45 on the upper end of an axis 49, here similar to a knob. The axes 49 here serve as a stopper for the locking bolt 46 on both sides thereof in the longitudinal direction (Y-axis). The bulge 45 together with an additional bulge 47 at the bottom of the extension 44 (Z-axis) serves as an additional, flange-like locking structure in the vertical direction (X-axis). FIG. 4C-4D show the locking state in which the locking bolt 46 engages with the extensions 44 in a form-locking manner.

As shown in FIG. 4C, said locking bolt 46 is supported for displacement parallel to the advancing direction (X-axis) of the extension arm 20, by means of a linear guide. The locking bolt 46 can be manually operated, but preferably it is automatically pushed in and out via a separate drive mechanism forming part of the coupling piece 26, e.g. by means of an electrical linear shaft (not further shown). If necessary, the plug connector 30 can be manipulated with this driving of the locking bolt 46 via a reduction gear.

FIG. 5A-5C illustrate the automatic coupling of the supply lines 33 between the entrainment member 24 and the extension arm 20. For this purpose, the plug connector 30 is guided by a linear shaft and in a manner so as to be fed parallel to the advancing direction (X-axis) of the extension arm 20. Said linear shaft 50 is fixed for example laterally on the protective housing 51 of the coupling piece 26. The socket 32 of the plug connector 30 also comprises a protective housing 52 on the entrainment member 24. For additional protection against influences of weather, a spring-loaded pivoting flap 54 is provided on the protective housing 52, which flap opens or closes along with the extension or retraction of the plug connector 30 (FIG. 5B). With the structure shown in FIG. 5A-5C it is possible to use commercially available proven components for the actual plug or socket of the plug connector 30.

FIG. 6 shows the system 10 in a cross section and including among others a guide channel 64 for the energy guiding chain 12, the guide channel 64 defining a linear route perpendicular to the plane of the Figures. Said guide channel 64 simultaneously forms a mechanical longitudinal guide by sliding strips 66 for skids on the bottom of the carriage 35 of the entrainment member 24. The longitudinal guidance by said sliding strips 66 contributes to avoiding lateral forces at the final chain link of the energy guiding chain 12, i.e. lateral loads in the hinge connections of the energy guiding chain 12. The float 34, which is provided especially for that purpose, is shown in more detail also in FIG. 6. The float 34 comprises two horizontal shafts fixed to the carriage 35 on which sliding or roller bearings fixed to the base plate 43 support the upper part of the entrainment member 24 with horizontal play parallel to the advancing direction (X-axis). In this manner, lateral forces at the coupling counterpart 28 will not be transmitted to the actual energy guiding chain 12 during normal operation.

FIG. 6 shows the principle of the advancing control 60 in a schematic diagram, said advancing control 60 newly adjusting if necessary the horizontal position along the X-axis for notably extending the tolerance range of the entrainment member 24. The advancing control 60 employs two proximity switches as a measuring element. Said proximity switches 62 are provided on both sides of the entrainment member 24, for detecting the position of the base plate 43 or the coupling counterpart 28, and are connected to the advancing control via said plug connector 30. Prior to the consumption of the lateral play of the float 34, this state is signalized to the advancing control 60 by the respective proximity switch 62.

The advancing control 60 utilizes the transverse advancer unit 16 of the docking device 14 as an actuator. Depending on the deviation of the RTG 11 from the track, which deviation is detected via the respective proximity switch 62, the advancing control 60 respectively newly adjusts the horizontal position of the extension arm 20 during mobile. To this end, the advancing control 60 operates the drive of the transverse advancer unit 16 for extending (+X in FIG. 6) or for retracting (−X in FIG. 6) the end portion 22. This makes sure that the available minor horizontal play of the float on the entrainment member 24 is not exceeded. Should the extension arm 20 itself contact the limit stop, an emergency stop or emergency undocking may be triggered. In this manner, larger deviations of a directional instable consumer, e.g. an RTG 11, from the track can be tolerated without damaging the energy guiding chain 12 or the guide channel 64.

Preferably, the advancing control 60 simultaneously constitutes the control of the docking device 14, i.e. of the individual advancer units 16, 17, 18.

In the case of minor deviations from the track, it is possible as an alternative to the illustrated embodiment, to do without the detector arrangement including the proximity switches 62 and without the corresponding re-adjustment of the extension arm 20. In this case, the advancer device 60 merely serves the automation of the docking device 14. In this variant, the float 34 with an appropriately chosen play can already protect the energy guiding chain 12 against lateral forces. Such a design is suitable for instance for a rail-born vehicle. In the case of higher lateral forces, e.g. in the extension arm 20 without free-wheeling in the horizontal direction, it is expedient to provide a longitudinal guide together with the float 34, e.g. by the sliding strips 66.

Finally, FIG. 6 shows a weather protection 68 in the form of a roof that surrounds the guide channel 64 as far as possible. However, along the whole length of the guide channel 64 (perpendicular to the plane in FIG. 6), a lateral elongate gap 69 having a height sufficient for penetration and for the vertical adjustment (Z-axis) of the docking device 14 is provided. The guide channel 64 can be designed in any desired manner, e.g. in accordance with WO96/31710 A1 or WO97/40289 A1.

LIST OF REFERENCE NUMBERS 10 system for automatic docking
11 RTG
12 energy guiding chain
14 coupling device
16 transverse advancer unit
17 vertical advancer unit
18 longitudinal advancer unit
20 extension arm
22 end portion
24 entrainment member
26 coupling piece
28 coupling counterpart
30 plug connector
32 socket
33 supply line
34 float
35 carriage
36, 37, 38 position transmitter
40 funnel
42 coupling head
43 base plate
44 extension
45 bulge
46 locking bolt
47 bulge
48 centering slope
49 axis
50 linear shaft
51, 52 protective housing
54 pivoting flap
60 advancing control (schematic)
62 proximity switch
64 guide channel
66 sliding strips
68 weather protection
69 longitudinal gap

What is claimed is:

1. A system for automatically docking a mobile machine to a movable supply, the system comprising:
    a docking device with a transverse advancer unit and an extendable extension arm, wherein an end portion of the extension arm is advanceable transversely to the movable supply and the end portion is configured to connect to the movable supply;
    the movable supply comprising an energy guiding chain and an entrainment member connected to the energy guiding chain;
    a coupling piece on the end portion of the extension arm and a coupling counterpart on the entrainment member, the coupling piece and the coupling counterpart connectable to fix a position of the extension arm and the entrainment member; and
    a plug connector on the end portion of the extension arm and a cooperating socket on the entrainment member, the plug connector and the cooperating socket connectable to supply the mobile machine with energy.

2. The system according to claim 1, further comprising a guide channel in which the energy guiding chain is depositable and which defines a route for the energy guiding chain.

3. The system according to claim 2, wherein the guide channel provides a longitudinal guide for the entrainment member.

4. The system according to claim 2, wherein the guide channel includes a weather protection for the docking device.

5. The system according to claim 1, further comprising an advancing control operable with a detector arrangement on the entrainment member and with the transverse advancer unit, for adjusting horizontal position of the end portion of the extension arm during operation, and wherein the advancing control is configured as an open-loop control or as a closed-loop control, and wherein the advancing control is configured to trigger an emergency stop or an automatic undocking of the entrainment member before the extension arm is retracted or extended up to a limit stop.

6. The system according to claim 5, wherein the detector arrangement comprises at least one proximity switch provided on the entrainment member, wherein the proximity switch is connectable to the advancing control or to the advancing control through a plug connector on the docking device.

7. The system according to claim 1, wherein a range of the extendable extension arm is at least three times[[ ]] a horizontal play on the entrainment member, wherein the horizontal play in a range of 25% to 100% of a width of the energy guiding chain.

8. The system according to claim 1, wherein the energy guiding chain carries one or more electric current supply lines, one or more optical data transmission lines and/or one or more hose pipes for media supply, which are automatically dockable by the docking device.

9. The system according to claim 1, wherein the mobile machine is a container stacker crane.

10. The system according to claim 1, further comprising the coupling piece configured as a funnel and the coupling counterpart configured as a coupling head and a locking bolt for mechanically locking the coupling head in the funnel, the coupling head being at least partly insertable in the funnel in a longitudinal direction;
the coupling head including at least one extension which, for securing perpendicular to the longitudinal direction, connects with the funnel and/or the locking bolt in a form-locking manner, and the locking bolt connects with the at least one extension for securing in the longitudinal direction, such that the coupling head, after being locked in the funnel, is in a fixed position.

11. The system according to claim 10, wherein the funnel includes a seat, which secures the at least one extension against twisting.

12. The system according to claim 10, wherein the at least one extension further comprises two bollard-shaped extensions, with a bulge provided on an upper end of each extension.

13. The system according to claim 10, wherein the at least one extension is at least partially insertable in the funnel in the longitudinal direction, and a slope is provided on the funnel for centering insertion of the extension in the funnel.

14. System A system for automatically docking a mobile machine to a movable supply, the system comprising:

a docking device with a transverse advancer unit and an extendable extension arm, wherein an end portion of the extension arm is advanceable transversely to the movable supply and the end portion is configured to connect to the movable supply;
the movable supply comprising an energy guiding chain and an entrainment member connected to the energy guiding chain;
a coupling piece on the end portion of the extension arm and a coupling counterpart on the entrainment member, the coupling piece and the coupling counterpart connectable to provide a mechanical coupling; and
the entrainment member floatingly supports the coupling counterpart with lateral play transversely to the energy guiding chain.

15. A docking device for automatically docking a mobile machine to a movable supply, the docking device comprising:
a transverse advancer unit with an extendable extension arm, wherein an end portion of the extension arm is advanceable transversely to the movable supply;
a vertical advancer unit by which the end portion of the extension arm is advanceable vertically;
a coupling piece on the end portion of the extension arm is configured to be connected to a coupling counterpart on an entrainment member of an energy guiding chain, the coupling piece configured to be connected to the coupling counterpart to fix a position of the extension arm and the entrainment member; and
a plug connector on the end portion of the extension arm, the plug connector configured to be connected to a cooperating socket on the entrainment member to supply the mobile machine with energy.

16. The docking device according to claim 15, further comprising a longitudinal advancer unit by which the end portion of the extension arm is advanceable in a longitudinal direction.

17. The docking device according to claim 15, wherein at least one position transmitter is provided on the end portion of the extension arm for determining a position of the extension arm, and wherein the position transmitter is operable with an advancing control.

18. The docking device according to claim 15, wherein the plug connector is operatively connected to an independent drive such that a plug connection with the cooperating socket is providable independently of a connection of the coupling piece with the coupling counterpart.

* * * * *